United States Patent
Lukacs

(10) Patent No.: US 11,140,115 B1
(45) Date of Patent: Oct. 5, 2021

(54) SYSTEMS AND METHODS OF APPLYING SEMANTIC FEATURES FOR MACHINE LEARNING OF MESSAGE CATEGORIES

(71) Applicant: GOOGLE LLC, Mountain View, CA (US)

(72) Inventor: Laszlo Lukacs, Adliswil (CH)

(73) Assignee: GOOGLE LLC, Mountain View, CA (US)

( * ) Notice: Subject to any disclaimer, the term of this patent is extended or adjusted under 35 U.S.C. 154(b) by 945 days.

(21) Appl. No.: 14/565,235

(22) Filed: Dec. 9, 2014

(51) Int. Cl.
*H04L 12/58* (2006.01)
*G06N 20/00* (2019.01)

(52) U.S. Cl.
CPC .............. *H04L 51/22* (2013.01); *G06N 20/00* (2019.01)

(58) Field of Classification Search
CPC ................................ H04L 51/22; G06N 20/00
See application file for complete search history.

(56) References Cited

U.S. PATENT DOCUMENTS

| | | | | |
|---|---|---|---|---|
| 5,799,268 | A * | 8/1998 | Boguraev | G06F 17/2775 704/10 |
| 6,732,097 | B1 * | 5/2004 | Wakefield | G06F 17/30619 |
| 6,738,765 | B1 * | 5/2004 | Wakefield | G06F 17/30595 |
| 7,143,091 | B2 * | 11/2006 | Charnock | G06F 17/30716 |
| 7,171,349 | B1 * | 1/2007 | Wakefield | G06F 17/30619 704/9 |
| 7,542,894 | B2 * | 6/2009 | Murata | G06F 17/27 704/1 |
| 7,558,778 | B2 * | 7/2009 | Carus | G06N 99/005 |
| 7,567,895 | B2 * | 7/2009 | Chen | G06F 17/30 704/1 |
| 7,617,285 | B1 * | 11/2009 | Hartmann | G06F 17/30707 707/999.007 |
| 7,742,911 | B2 * | 6/2010 | Chotimongkol | G06F 17/278 704/4 |
| 8,112,484 | B1 * | 2/2012 | Sharma | H04L 51/12 706/20 |

(Continued)

OTHER PUBLICATIONS

Turenne, "Learning Semantic Classes for improving Email Classification," in Proceeding of the Text Link Conference, 2003.*

(Continued)

*Primary Examiner* — Benjamin P Geib
(74) *Attorney, Agent, or Firm* — Botos Churchill IP Law LLP

(57) ABSTRACT

A method of assigning categories to electronic messages is performed at a computing device having one or more processors and memory. The method includes receiving an electronic message and extracting one or more syntactic pairs of words from content of the electronic message. At least one of syntactic pairs includes a verb in a first sentence and an object in the same sentence, where the verb operates on the object. The method forms a feature vector based on the extracted syntactic pairs and uses the feature vector as input to a classifier. The classifier is trained on a set of training feature vectors, and each training feature vector is associated with a respective category. The method assigns a first category to the electronic message based on output of the classifier and displays the message in a group with other messages associated with the first category.

12 Claims, 7 Drawing Sheets

(56) References Cited

U.S. PATENT DOCUMENTS

| | | | | |
|---|---|---|---|---|
| 8,170,966 | B1* | 5/2012 | Musat | H04L 51/12 706/14 |
| 8,489,689 | B1* | 7/2013 | Sharma | G06Q 10/107 709/206 |
| 2002/0111941 | A1* | 8/2002 | Roux | G06F 17/30684 |
| 2002/0159642 | A1* | 10/2002 | Whitney | G06K 9/6228 382/225 |
| 2004/0148170 | A1* | 7/2004 | Acero | G06F 17/2715 704/257 |
| 2005/0038805 | A1* | 2/2005 | Maren | G06F 17/30029 |
| 2005/0108281 | A1* | 5/2005 | Kim | G06F 17/277 |
| 2005/0108630 | A1* | 5/2005 | Wasson | G06F 17/241 715/230 |
| 2005/0278362 | A1* | 12/2005 | Maren | G06F 17/30943 |
| 2006/0190481 | A1* | 8/2006 | Alspector | G06Q 10/107 |
| 2007/0118519 | A1* | 5/2007 | Yamasawa | G06F 17/30976 |
| 2007/0282814 | A1* | 12/2007 | Gupta | G06F 17/27 |
| 2008/0010274 | A1* | 1/2008 | Carus | G06N 99/005 |
| 2009/0112892 | A1* | 4/2009 | Cardie | G06F 17/30719 |
| 2009/0157720 | A1* | 6/2009 | Kolcz | G06Q 10/10 |
| 2009/0171870 | A1* | 7/2009 | Dasgupta | G06K 9/6231 706/12 |
| 2009/0326919 | A1* | 12/2009 | Bean | G06F 17/2775 704/9 |
| 2010/0312769 | A1* | 12/2010 | Bailey | G06F 17/30705 707/740 |
| 2011/0106807 | A1* | 5/2011 | Srihari | G06F 17/30604 707/739 |
| 2011/0238411 | A1* | 9/2011 | Suzuki | G06F 17/271 704/9 |
| 2012/0078636 | A1* | 3/2012 | Ferrucci | G06F 17/30507 704/270.1 |
| 2012/0150920 | A1* | 6/2012 | Roulland | G06F 17/30011 707/805 |
| 2013/0246046 | A1* | 9/2013 | Fan | G06F 17/2785 704/9 |
| 2014/0058984 | A1* | 2/2014 | Shinzato | G06F 17/30268 706/12 |
| 2014/0278341 | A1* | 9/2014 | Ranjan | G06F 17/2854 704/2 |
| 2015/0057992 | A1* | 2/2015 | Danielyan | G06F 17/271 704/2 |
| 2015/0127323 | A1* | 5/2015 | Jacquet | G06F 17/271 704/9 |
| 2015/0278197 | A1* | 10/2015 | Bogdanova | G06F 17/2785 704/9 |
| 2016/0034457 | A1* | 2/2016 | Bradley | G06F 17/3043 707/749 |
| 2016/0117386 | A1* | 4/2016 | Ajmera | G06F 17/30684 707/740 |
| 2017/0161372 | A1* | 6/2017 | Fern Ndez | G06F 17/218 |
| 2017/0228361 | A1* | 8/2017 | Zhang | G06F 17/2705 |
| 2018/0067922 | A1* | 3/2018 | Kawada | G06F 17/2775 |

OTHER PUBLICATIONS

Cartwright et al., "Syntactic categorization in early language acquisition: formalizing the role of distributional analysis," Cognition 63 (1997) 121-170.*

Panicheva et al., "Identifying Subjective Statements in News Titles Using a Personal Sense Annotation Framework," Journal of the American Society for Information Science and Technology, vol. 64, Issue 7, pp. 1411-1422, Jul. 2013.*

Ringger et al., "Task-focused Summarization of Email," in Proceedings of the ACL 24 Workshop "Text Summarization Branches Out". Barcelona, Spain, 2004.*

Moschitti, "Syntactic and Semantic Kernels for Short Text Pair Categorization," in Proceedings of the 12th Conference of the European Chapter of the ACL, pp. 576-584, Athens, Greece, Mar. 30-Apr. 3, 2009.*

Grefenstette, "Evaluation Techniques for Automatic Semantic Extraction : Comparing Syntactic and Window Based Approaches," in Corpus processing for Lexical Acquisition ed. B.Boguraev, J Pustejovsky MIT 1996.*

Seki, "A Multilingual Polarity Classification Method using Multlabel Classification Technique Based on Corpus Analysis," in Proceedings of NTCIR-7 Workshop Meeting, Dec. 16-19, 2008, Tokyo, Japan.*

Skadina et al., "Comprehension Assistant for Languages of Baltic States," in Proceedings, NODALIDA 2007, pp. 167-174.*

Scerri et al., "Classifying Action Items for Semantic Email", ResearchGate, 2010. (Year: 2010).*

Carvalho, Vitor, and William Cohen. "Improving "email speech acts" analysis via n-gram selection." Proceedings of the Analyzing Conversations in Text and Speech. 2006. (Year: 2006).*

Cohen, William, Vitor Carvalho, and Tom Mitchell. "Learning to classify email into "speech acts"." Proceedings of the 2004 Conference on Empirical Methods in Natural Language Processing. 2004. (Year: 2004).*

* cited by examiner

SYSTEMS AND METHODS OF APPLYING SEMANTIC FEATURES FOR MACHINE LEARNING OF MESSAGE CATEGORIES

TECHNICAL FIELD

The disclosure relates generally to categorizing electronic messages, and more specifically to categorizing electronic messages using semantic features of message content.

BACKGROUND

Electronic messaging, such as through email, is a powerful communication tool for the dissemination of information. However, the ease of sending messages can result in a recipient receiving large numbers of messages in a single day. This is because, in addition to messages sent by actual people, a recipient may receive messages generated by machines from third party services such as airlines, invitation generating companies, courier services, and social media sites. These messages may include confirmations, notifications, promotions, social media updates, and messages from collaboration systems.

The classification of messages into message categories helps recipients to parse through all of these messages. For example, having messages classified into just a few basic categories (e.g., promotions, social, updates, and forums) greatly assists a recipient in determining which messages to review, and allows the recipient to review message that are of a similar type at the same time (e.g., all personal messages at the same time, all promotional messages at the same time, etc.). Moreover, such classification helps to put similar messages in the same place, for ease of comparison. Message classification provides a more efficient, productive environment for recipients.

Classification using sets of rules can be effective for many messages, but certain messages are not well suited for rules-based classification. Some automated classifiers, such as neural networks, can be trained to categorize messages based on words, but categorization based on a list of words is imperfect as well. For example, in some instances it is difficult to distinguish between a promotion and an important message from a company.

SUMMARY

Disclosed implementations address the above deficiencies and other problems associated with categorizing electronic messages.

In accordance with some implementations, a method assigns categories to electronic messages. The method is performed at a computing device having one or more processors and memory storing one or more programs configured for execution by the one or more processors. The computing device receives an electronic message and extracts one or more syntactic pairs of words from content of the electronic message. At least one of the one or more syntactic pairs comprises a verb in a first sentence and an object in the same sentence, and the verb operates on the object. In some implementations, at least one of the one or more syntactic pairs comprises a verb in a second sentence and a subject in the same second sentence, where the subject performs the verb. The computing device forms a feature vector based on the extracted syntactic pairs and uses the feature vector as input to a classifier. The classifier is trained on a set of training feature vectors, and each training feature vector is associated with a respective category. In some implementations, each training feature vector corresponds to an electronic message previously received by one or more users, and the set of training feature vectors is selected based upon failure of rules-based categorization to identify correct categories for the electronic messages corresponding to the training feature vectors. The computing device assigns a first category to the electronic message based on output of the classifier and displays the message in a group with other messages associated with the first category.

Some implementations compute a classification score for the electronic message, and assign the first category to the electronic message only when the classification score exceeds a threshold value.

Some implementations group together in a folder the message and the other messages associated with the first category. Some implementations display all of the messages assigned to the first category together.

In some implementations, the one or more programs are part of an email application or an instant messaging application.

In some implementations, the extracted syntactic pairs of words are limited to a predetermined universe of syntactic pairs. For example, some implementations define a universe of 10000 syntactic pairs, and only those pairs are extracted. In some implementations, the universe of syntactic pairs is larger or smaller (e.g., a universe of 500 syntactic pairs or 50,000 syntactic pairs).

In some implementations, the feature vector includes one or more features based on metadata from the message. In some implementations, the feature vector includes one or more features based on individual words.

Thus methods and systems are provided that classify electronic messages more accurately.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

The implementations described herein provide various technical solutions to improving the categorization of electronic messages generally, and to improving classifiers that automatically determine the category of electronic messages.

Figure 1:
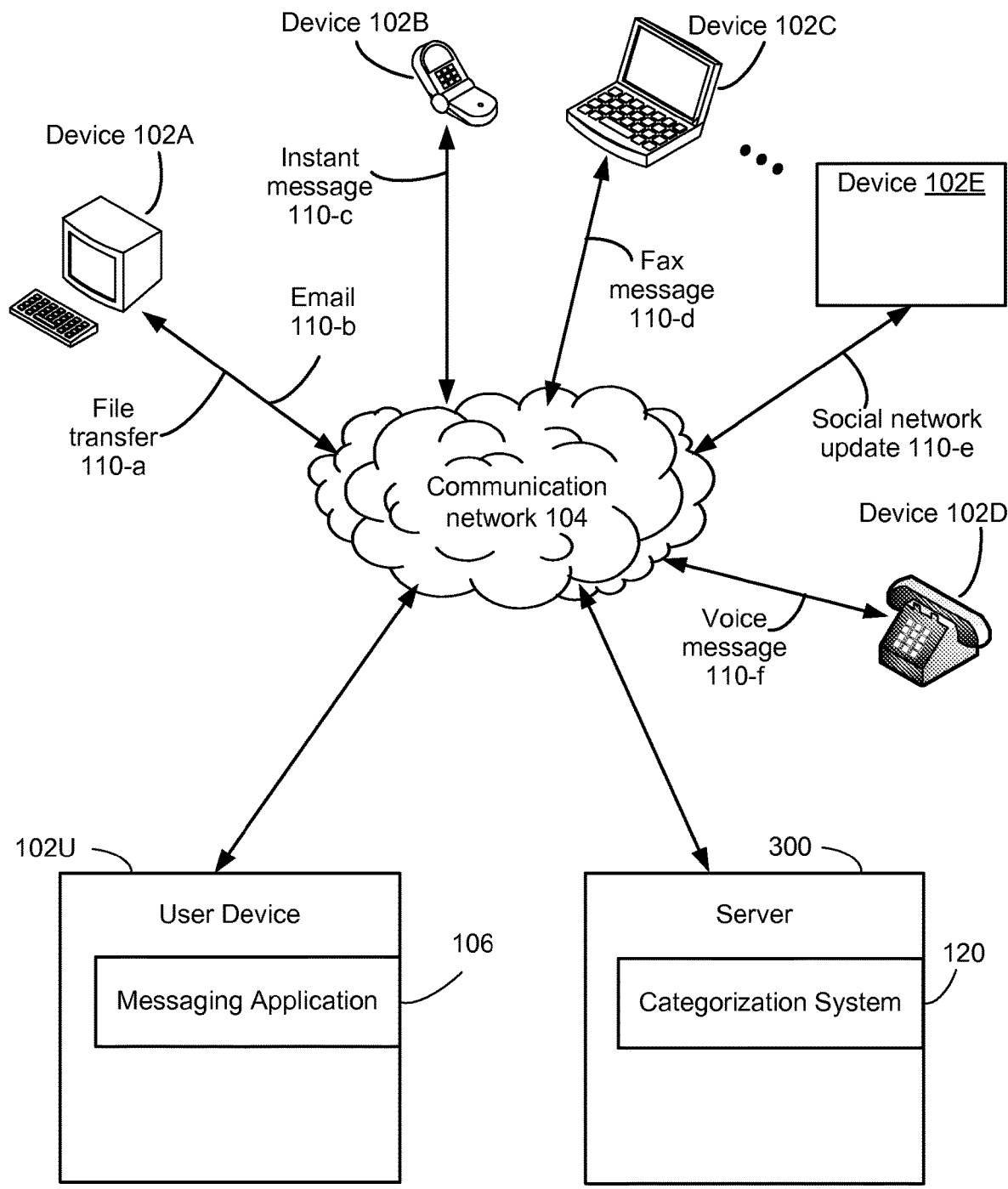
FIG. 1 illustrates a context in which some implementations operate.

FIG. 1 is a block diagram illustrating conceptually a context in which some implementations operate. Electronic messages may be generated by many different devices 102, such as a desktop computer 102A, a smart phone 102B, a laptop computer 102C, a telephone 102D, or an automated server 102E. The messages are transmitted over a communication network 104, and processed by a categorization system 120 at a server 300, or by a categorization module 224 within a messaging application 106 running on the message recipient's user device 102U. More generally, devices 102 that may transmit messages include phones (mobile or landline, smart phone or otherwise), tablet computers, other computers (mobile or otherwise, personal devices or servers), fax machines, and audio/video recorders.

In some implementations, a device 102U obtains an electronic message and transmits the electronic message to the categorization system 120. After categorization, the electronic message can be displayed with other electronic messages in the same category. For example, after determining that user Jack sends an electronic message to user Mary, the device 102U transmits the electronic message to the categorization system 120, which assigns the electronic message to a category and generates a visual object for display in a listing of electronic messages. This is illustrated below in FIG. 4. In some implementations, the message is initially received at the server 300, categorized by the categorization system 120, and displayed appropriately at the user device 102U. In some implementations, the message is received at the user device 102U, processed by a categorization module 224, and displayed appropriately.

In some implementations, an electronic message is a file transfer 110-a (e.g., a photo, document, or video download/upload), an email 110-b, an instant message 110-c, a fax message 110-d, a social network update 110-e, or a voice message 110-f. In some implementations, an electronic message is contact information, an indication of a document, a calendar entry, an email label, a recent search query, a suggested search query, or a web search result.

In some implementations, the user device 102U includes a messaging application 106. In some implementations, the messaging application 106 processes incoming and outgoing electronic messages into and from the device 102U, such as an outgoing email sent by a user of the device 102U to another user, or a chat message from another user to a user of the device 102U. In some implementations the messaging application 106 is an e-mail application or an instant messaging application.

In some implementations, the communication network 104 interconnects one or more devices 102 with each other, and with the server 300. In some implementations, the communication network 104 includes the Internet, one or more local area networks (LANs), one or more wide area networks (WANs), other types of networks, or a combination of such networks.

An example of a set of message categories is {promotions, social, updates, and forums}. Each message category in the set of message categories requires that a message have certain characteristics. A message containing a reservation may be classified as an "update" message. A message containing information about an event may be "promotion" message. If a recipient is asked to rate something, the email may be a "social" message. Some implementations include additional messages categories and/or allow users to create custom message categories.

In some implementations, the server 300 is part of a server system that includes a plurality of servers 300. In some implementations, the servers 300 are connected by an internal communication network or bus. A server system may include one or more web servers 322, which receive requests from users (e.g., from client devices 102) and return appropriate information, resources, links, and so on. In some implementations, the server system includes one or more application servers 324, which provide various applications, such as a messaging application 106. The server system typically includes one or more databases 332, which store information such as web pages, a user list 334, and various user information 338 (e.g., user names and encrypted passwords, user preferences, and so on).

Figure 2:
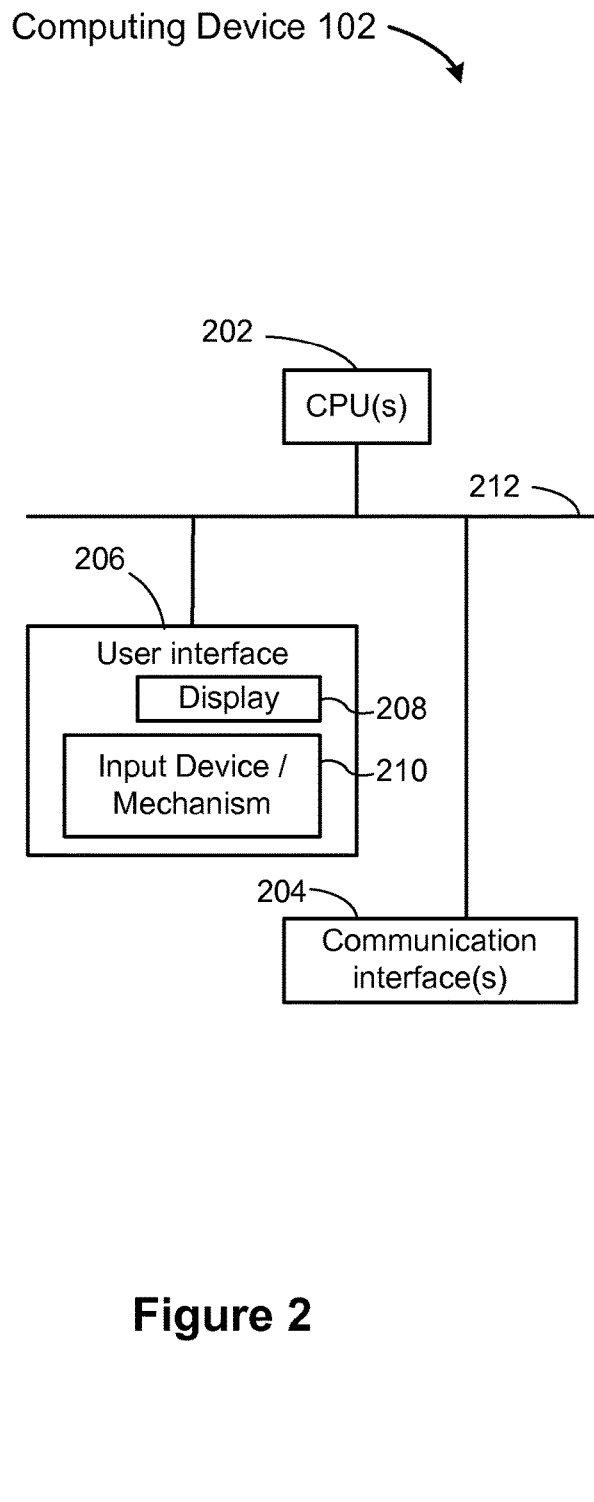
FIG. 2 is a block diagram of a computing device according to some implementations.

FIG. 2 is a block diagram illustrating a computing device 102, which a user uses to access a messaging application 106. A computing device is also referred to as a client device or a user device, which may be a tablet computer, a laptop computer, a smart phone, a desktop computer, a PDA, or other computing device that can run a messaging application 106 and has access to a communication network 104. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

an operating system 216, which includes procedures for handling various basic system services and for performing hardware dependent tasks;
  a communications module 218, which is used for connecting the client device 102 to other computers and devices via the one or more communication network interfaces 204 (wired or wireless) and one or more communication networks 104, such as the Internet, other wide area networks, local area networks, metropolitan area networks, and so on;

a display module 220, which receives input from the one or more input devices 210, and generates user interface elements for display on the display device 208;

a web browser 222, which enables a user to communicate over a network 104 (such as the Internet) with remote computers or devices;

a messaging application 106, which enables the user to send and receive electronic messages. In some implementations, the messaging application is an email application. In some implementations, the messaging application is an instant messaging application. In some implementations, the messaging application 106 runs within the web browser 222. In some implementations, the messaging application 106 runs independently of a web browser 222 (e.g., a desktop application). In some implementations, the messaging application includes a categorization module 224, which assigns a category to each message. The categorization module is functionally similar to a categorization system 120, described below with respect to the server 300; and a plurality of categories 226, such as the categories 226-1 and 226-2 illustrated in FIG. 2. Each category may be assigned to zero or more messages so that messages assigned to the same category can be displayed together. In the illustrated example of FIG. 2, the first category 226-1 includes a first message 228-1 and a second message 228-2. Similarly, the second category 226-2 includes a third message 228-3 and a fourth message 228-4.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
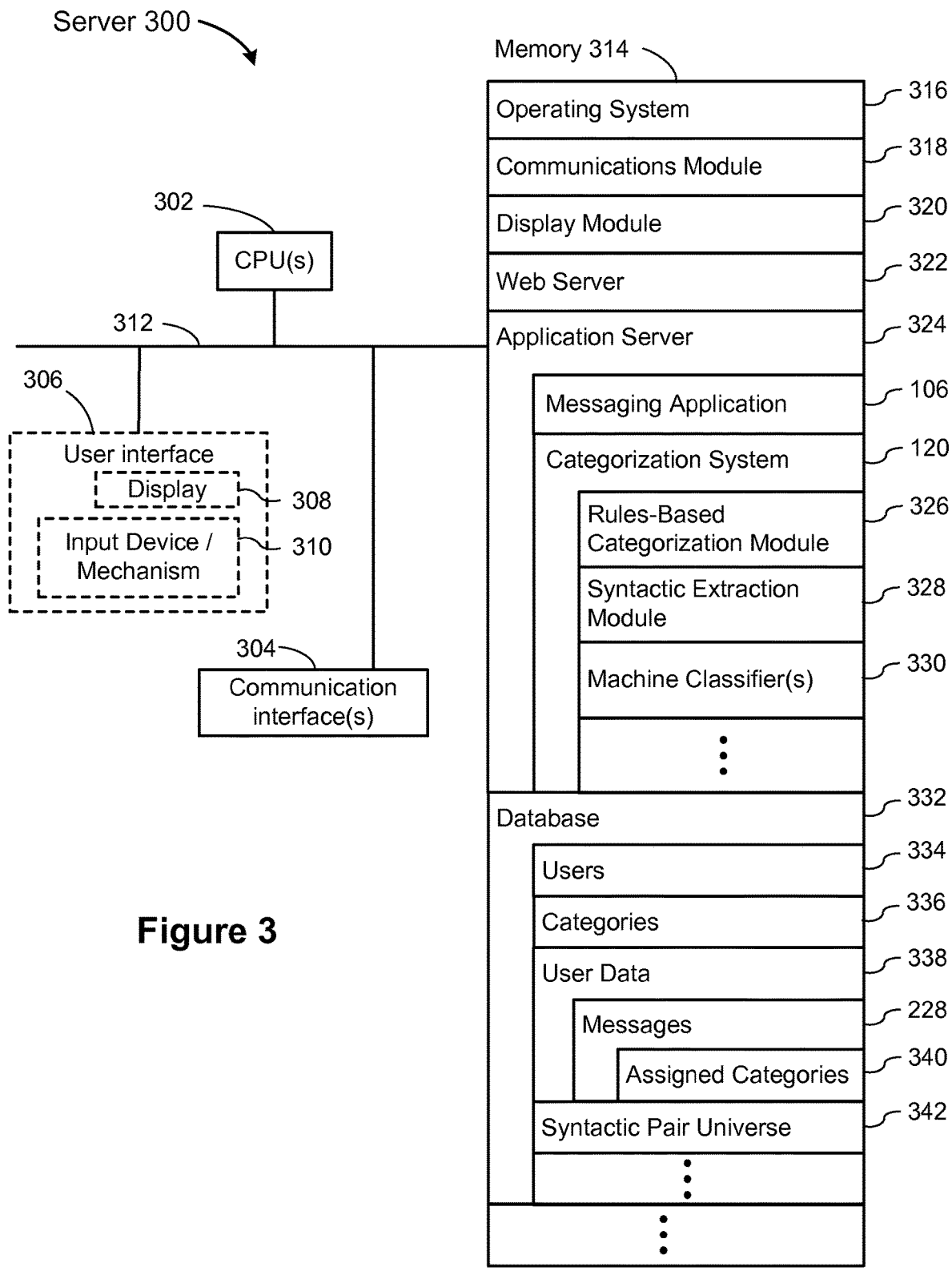
FIG. 3 is a block diagram of a server according to some implementations.

FIG. 3 is a block diagram illustrating a server 300, which may be used individually or as part of a server system. A typical server system includes many individual servers 300, such as 3, 10, or 100 individual servers. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

Figure 4:
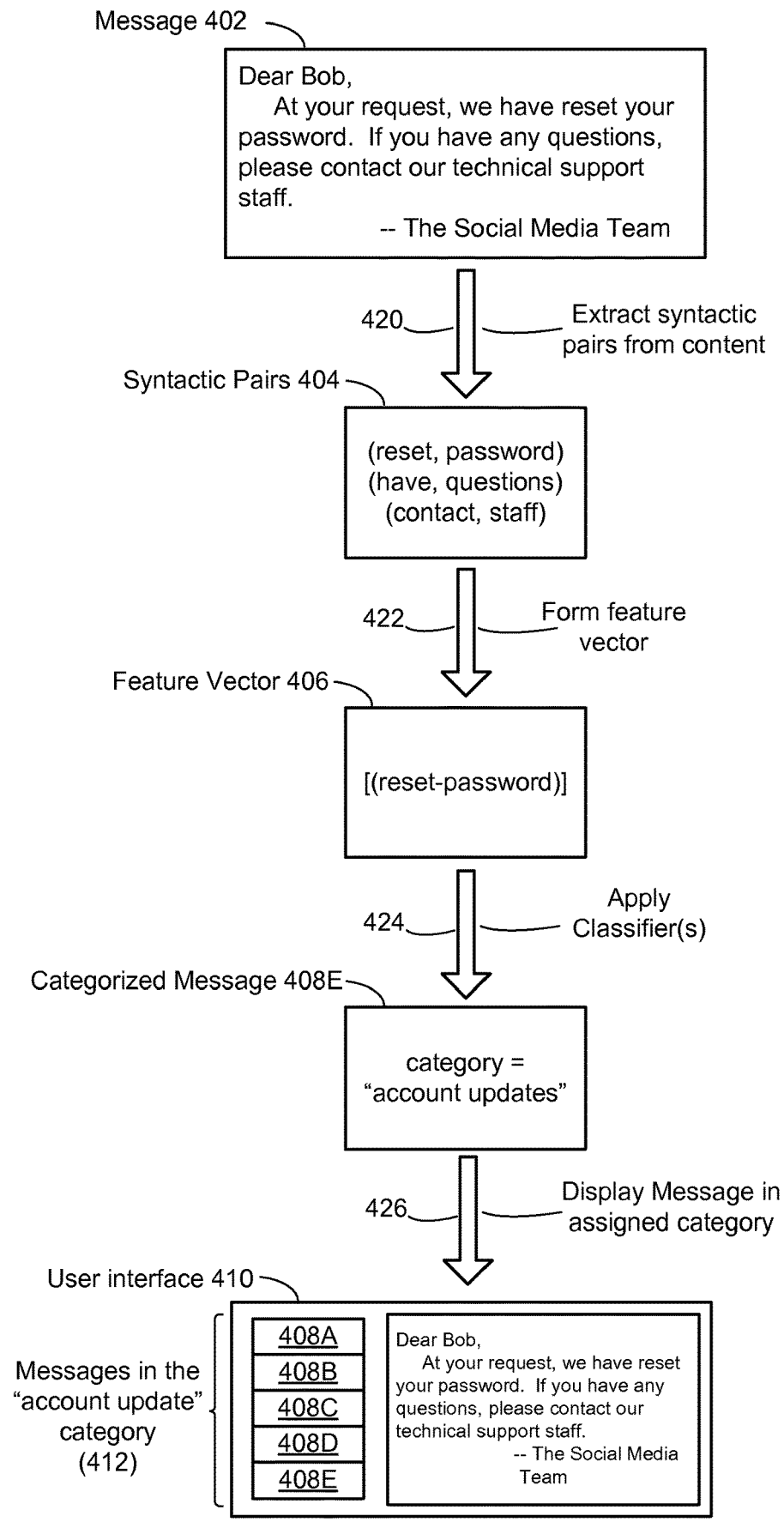
FIG. 4 illustrates a process of determining a category corresponding to a message in accordance with some implementations.
Figure 5:
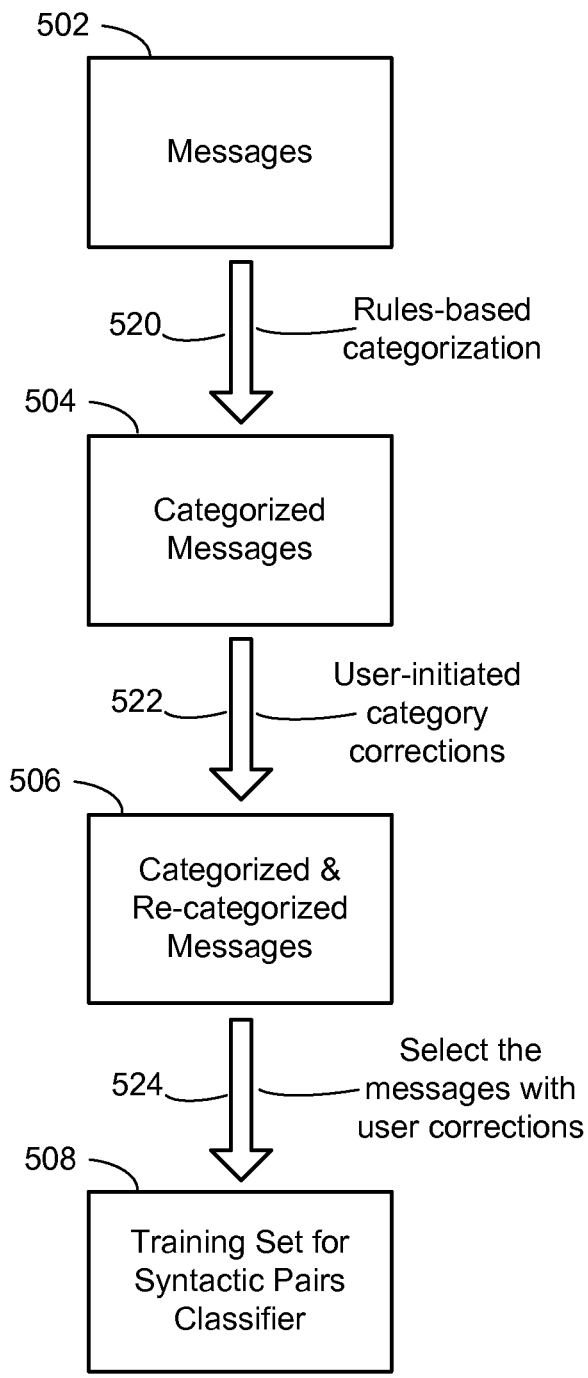
FIG. 5 illustrates a process of building a training set of messages for a classifier in accordance with some implementations.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

an operating system 316, which includes procedures for handling various basic system services and for performing hardware dependent tasks;

a communications module 318, which is used for connecting the server 300 to other computers via the one or more communication network interfaces 304 (wired or wireless), an internal network or bus, or other communication networks 104, such as the Internet, other wide area networks, local area networks, metropolitan area networks, and so on;

a display module 320, which receives input from one or more input devices 310, and generates user interface elements for display on a display device 308;

one or more web servers 322, which receive requests from a client device 102, and return responsive web pages, resources, or links. In some implementations, each request is logged in the database 332;

one or more application servers 324, which provide various applications (such as an email or other messaging application 106) to the client devices 102. In some instances, applications are provided as a set of web pages, which are delivered to the client devices 102 and displayed in a web browser 222. The web pages are delivered as needed or requested. In some instances, an application is delivered to a client device 102 as a download, which is installed and run from the client device 102 outside of a web browser 222;

in some implementations, the messaging application 106 includes a categorization system 120, which is used to categorize received messages so that they can be grouped together for the recipient. Some implementations include a rules-based categorization module 326, which categorizes received messages based on a set of rules (e.g., if a message is from a certain set of senders and includes a specific keyword, then the message is categorized as a "social update"). In some implementations, rules-based categorization is effective for a large percentage of the incoming messages. Disclosed implementations include a syntactic extraction module 328, which extracts syntactic pairs of words from content of the received message (or the subject line). Some implementations use SAFT (Semantic Analysis and Filtering of Text) to extract the syntactic pairs. Each syntactic pair is a pair of words from a single sentence with a specific relationship. Some pairs consist of a finite verb and a direct object of the verb. Some pairs consist of a subject and a finite verb that specifies an action taken (or to be taken) by the subject. The extracted syntactic pairs are used to form a feature vector that is used as input to one or more machine classifiers 330, which categorize the message. The categorization process is illustrated in FIG. 4, and a process for selecting training messages is illustrated in FIG. 5; and one or more databases 332, which store various data used by the modules or programs identified above. In some implementations, the database 332 includes a list of authorized users 334, which may include user names, encrypted passwords, and other relevant information about each user. The database 332 also stores categories 336, and information about the categories. Some implementations provide both system-defined categories as well as user-defined categories. The database also stores other user data 338. In particular, the user data 338 includes the received messages 228 and the assigned categories 340 for the messages. In some implementations, each message 228 is assigned to a unique category, but other implementations allow assignment to two or more categories. In some implementations, the database stores a universe 342 of syntactic pairs, which identifies the pairs that will be used in the categorization process (e.g., limiting the pairs to ones that are useful and reasonably likely to occur).

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as a functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a messaging application may be shared between a client device 102 and a server 300. In some implementations, after the messaging application is installed on a client device 102, the majority of the subsequent processing occurs on the client device 102. For example, the classification is performed by a categorization module on the client device. In other implementations, the majority of the processing and data storage occurs at a server 300, and the client device 102 uses a web browser 222 to view and interact with the data. For example, the categorization of messages may be performed by the categorization system 120 at the server 300, and the messages themselves are stored in the database 332 on the server. One of skill in the art recognizes that various allocations of functionality between the client device 102 and the server 300 are possible, and some implementations support multiple configurations (e.g., based on user selection).

FIG. 4 illustrates a process of categorizing a received message. In this skeletal example, the received message 402 has a small amount of content, which is a message to Bob from the social media team at a social networking site. The syntactic extraction module 328 analyzes (420) the message 402 and extracts (420) various syntactic pairs 404 from sentences in the message 402. In some implementations, the syntactic extraction module also extracts syntactic pairs from the subject line of the message 402 (not shown). In some implementations, the extraction process uses SAFT. In some implementations, the potential syntactic pairs are compared to a syntactic pair universe 342, which limits the extracted pairs to those that are more likely to be useful in the classification process.

Using the extracted syntactic pairs 404, the categorization system 120 forms (422) a feature vector 406. In some implementations, a universe 342 of syntactic pairs is applied while forming the feature vector 406, in order to reduce the number of less useful pairs. For example, here the pairs "(have, questions)" and "(contact staff)" have been omitted from the feature vector. These two pairs would probably not be useful to classify the message 402.

Next, one or more classifiers 330 are applied (424) to the feature vector 406 to identify an appropriate category for the message 402. In this example, the categorized message 408E has been assigned to the "account updates" category. In some implementations, classification scores are computed for one or more of the possible categories, where each score estimates the probability that the corresponding category is proper. In some implementations, the category with the highest score is assigned to the message 402. In some implementations, the category with the highest score is assigned to the message 402 only when the score exceeds a predefined threshold and/or exceeds the scores of other categories by a predefined positive margin. For example, with scores on a percentile scale, a threshold of 90% may be required or a positive margin of 10% or 20% greater than other categories may be required. In some implementations, if the threshold or margin requirements are not met, no category is assigned. In some implementations, two or more categories may be assigned if they each have a high classification score. In some implementations, a message can be assigned to only one system-defined category, but may be assigned to one or more user-defined categories as well.

In some implementations, machine classifiers 330 are used in conjunction with a rules-based classification module 326. For example, in some implementations, the rules-based classification module 326 determines an appropriate category and computes a score that indicates the probability that the classification is correct. The rules-based classification score may be compared to the score(s) of the classification scores of the one or more categories determined by the machine classifiers 330. In some implementations, the machine classification is used when the classification score for the machine classifier is greater than the classification score of the rules-based classification (or greater by a predefined positive margin).

After the message 402 has been assigned to a category, the message (or a summary indicator of the message) may be displayed (426) in a user interface 410. The skeletal user interface 410 displayed in FIG. 4 includes a group 412 of messages in the "account update" category, and the categorized message 408E is displayed. In some implementations, the categorization process illustrated in FIG. 4 occurs at a server 300, but the display occurs on the user device 102. In some implementations, the categorization occurs at the user device 102, and the message is then displayed on the same device.

FIG. 5 illustrates a process that is used in some implementations to select the set of training messages for the machine classifier(s). Whereas some implementations use a large set of randomly selected training messages (e.g., all messages received by some group of people during a one day period), some implementations select training messages in a more targeted way. For example, because rules-based classification has gotten fairly good, the greatest value for a machine classifier is for messages that are not handled well by rules-based classification.

The process in FIG. 5 starts with a set of messages 502, which can be arbitrary or random. A rules-based categorization module 326 identifies (520) categories for these messages to create a set of categorized messages. Note that not all of the messages are necessarily assigned to a category. In some instances, rules-based classification recognizes that it is not able to assign a category with a high enough certainty. Therefore, the categorized messages 504 typically include both messages that have been assigned to a category by the rules-based categorization module as well as some messages that could not be classified.

After assignment (or non-assignment) of categories to messages, users can correct (522) the assignments. User corrections are valuable because users are providing explicit information about the proper category for a message. After the corrections, the set of messages 506 includes: (1) messages that were categorized by the rules-based categorization module 326, and not changed by the recipient; (2) messages that were assign a rules-based category that were subsequently corrected by the recipient; (3) messages that were unassigned to any category by the rules-based categorization module, but subsequently assigned to a category by the recipient; and (4) messages that were not assigned to a category by the rules-based classification module and not assigned a category by the recipient.

Some implementations select (524) a subset of the categorized and re-categorized messages 506 to form a training set for the machine classifiers 330. In some implementations, the training set consists of those messages that were either corrected by the user and/or unclassified by the user (i.e., sets (2), (3), and (4) above). However, the fourth set may not be as useful because the proper category for those messages is not known. Therefore, some implementations select (524) the training set as those messages for which the user made an explicit assignment (i.e., sets (2) and (3) above).

Although not illustrated in FIG. 5, the training process extracts the syntactic pairs from each training message (similar to the process shown in FIG. 4) in order to correlate the syntactic pairs to the proper categories. In some implementations, the training process also identifies which of the syntactic pairs are useful, and builds the universe 342 based on the useful pairs.

Figure 6A:
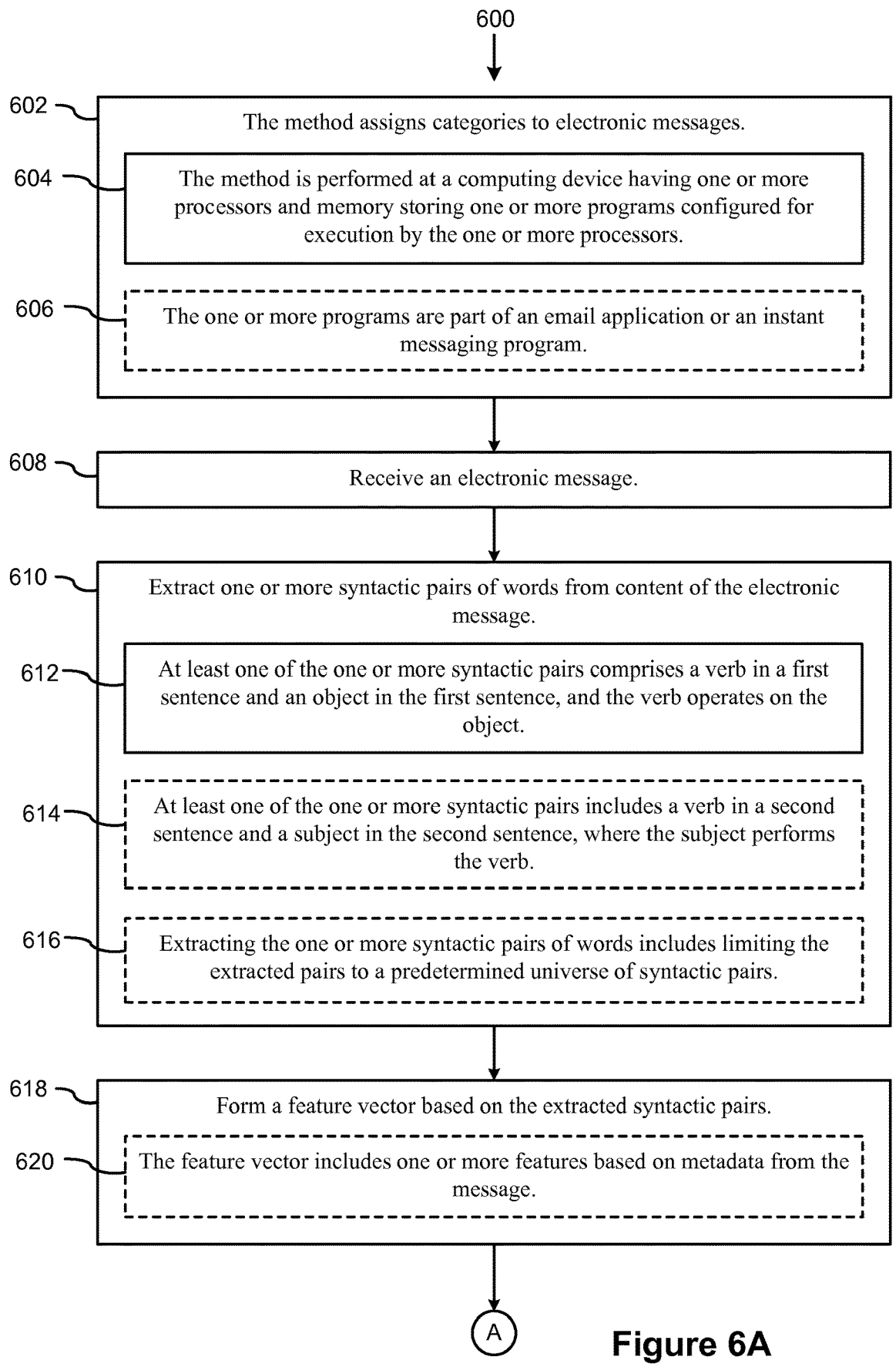
FIGS. 6A and 6B provide a flowchart of a process, performed at a client computing device or a server, for classifying electronic messages according to some implementations.
Figure 6B:
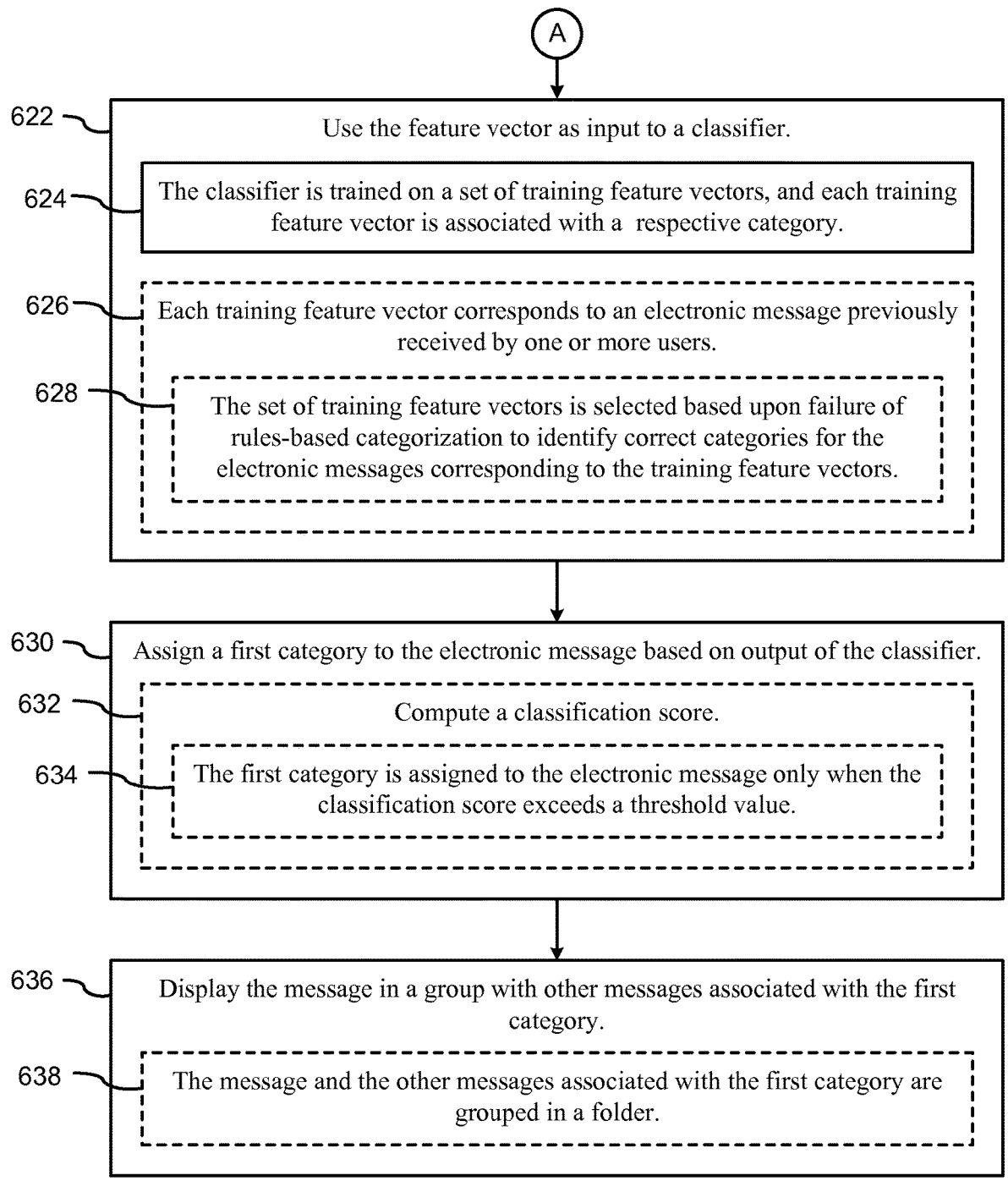

FIGS. 6A and 6B provide a flowchart of a process 600, performed by a computing device (e.g., a device 102 or a server 300), for categorizing (602) electronic messages. The method is performed (604) at a computing device having one or more processors and memory. The memory stores (604) one or more programs configured for execution by the one or more processors. In some implementations, the one or more programs are (606) part of an email application or an instant messaging application.

The computing device receives (608) an electronic message, such as an email or an instant message. A syntactic extraction module 328 extracts (610) one or more pairs of words from content of the electronic message. In some implementations, this is supplemented with syntactic pairs extracted from the subject line of the electronic message. At least one of the syntactic pairs comprises (612) a verb in a first sentence from the message content and an object in the same first sentence. The verb operates (612) on the object.

For example, in the sentence/phrase "unsubscribe from the list," the verb is "unsubscribe" and the object is "list."

In some instances, at least one of the syntactic pairs includes (614) a verb in a second sentence and a subject in the same second sentence, and the subject performs (614) the verb. For example, in the sentence "Company XYZ announces a new product," the subject is "Company XYZ" and the verb is "announces." Note that in this example, the subject consists of two separate words.

In some implementations, extracting the one or more syntactic pairs of words includes (616) limiting the extracted pairs to a predetermined universe of syntactic pairs. There are many syntactic pairs that have little or no value in classifying a message, so it can be useful to exclude those. In some implementations, the universe may be fairly small (e.g., 500 pairs), but in other implementations, the universe can be much larger (e.g., 5000 or more pairs).

The categorization system 120 or categorization module 224 forms (618) a feature vector based on the extracted syntactic pairs, as illustrated in FIG. 4 above. In some implementations, additional features in the feature vector are based on (620) metadata from the message.

Nonlimiting examples of metadata include, but are not limited to a determination as to whether a user associated with the message communicates directly with a certain other user, a message sender identity, a message recipient identity, a message category, a message date, a message sender domain, and a personal contact of the user associated with the message.

Additional examples of metadata are any of the fields found in the header of the protocol under which the electronic message is governed. For instance, if the electronic message is governed by the Simple Mail Transfer Protocol (See Request for Comments: 4321, dated October 2008, http://tools.ietf.org/html/rfc5321, last accessed Nov. 6, 2014, which is hereby incorporated by reference), than any of the message header sections or the elements contained therein, as referenced in companion document Request for Comments: 5322, dated October 2008, http://tools.ietf.org/html/rfc5322, last accessed Nov. 6, 2014 ("RFC 5322"), which is hereby incorporated by reference, can be extracted for use in the disclosed systems and methods. RFC 5322 details and defines metadata such as address, mailbox, name-addre, angle-addre, group, display-name, mailbox-list, address-list, group-list, addr-spec, local-part, domain, domain-literal, and dtext as exemplary header fields, any of which can be used as meta data in the disclosed systems and methods. Moreover, in some embodiments, the message category assigned (or not assigned) by a classifier to a message (e.g., social, promotions, updates, forums) constitute metadata in some embodiments. Moreover, in some embodiments, actions taken (or not taken) by a user on a message can constitute metadata. For instance, respective events (taken or not taken) such as reading an electronic message, replying to the electronic message, or recategorizing the electronic message can each constitute metadata for the electronic message. Further still, system labels that are (or are not) applied to a message can constitute metadata for a message. Examples of system labels include, but are not limited to inbox, starred, important, chats, sent mail, drafts, all mail, spam, and trash. Further still, social (circle) labels (e.g., friends, family, acquaintances, following, popular on social media, clients) that are (or are not) applied to a message can constitute meta data for the respective message.

The feature vector is used (622) as input to one or more machine classifiers 330. Each classifier is trained on (624) a set of training feature vectors, and each training feature vector is associated with (624) a respective category. In some implementations, each training vector corresponds to (626) an electronic message previously received by one or more users. In some implementations, the set of training feature vectors is selected (628) based upon failure of rules-based categorization to identify correct categories for electronic messages corresponding to the training feature vectors. This is illustrated above in FIG. 5.

The categorization system 120 or categorization module 224 assigns (630) a first category to the electronic message based on output of the classifier. In some implementations, a classification score is computed (632) for one or more categories, and the assignment is based on the score(s). In some implementations, the first category is assigned (634) to the electronic message only when the classification score exceeds a threshold value (e.g., 80th percentile). This is described above with respect to FIG. 4.

After the message is classified, the message is displayed (636) in a group with other messages associated with the first category. This is illustrated in FIG. 4. In some implementations, the message and the other messages associated with the first category are grouped (638) in a folder.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to explain the principles of the invention and its practical applications, to thereby enable others skilled in the art to best utilize the invention and various implementations with various modifications as are suited to the particular use contemplated.

What is claimed is:

1. A method of assigning categories to electronic messages, the method comprising:
    at a computing device having one or more processors and memory storing one or more programs configured for execution by the one or more processors:
        storing, in a database, a plurality of syntactic pairs of words which are likely to be useful to perform a categorization process;
        receiving an electronic message;
        extracting syntactic pairs of words from content of the electronic message,
            wherein at least one of the syntactic pairs of words comprises a verb in a first sentence of the electronic message and an object in the first sentence, and
            wherein the verb operates on the object in the first sentence;
        determining which ones of the extracted syntactic pairs of words match syntactic pairs of words stored in the database;
        forming a feature vector comprising the determined extracted syntactic pairs of words that match the syntactic pairs of words stored in the database;
        determining a first category based on the feature vector using a rules-based classification process and a machine classification process;
        selecting a highest classification score from among a classification score computed according to the rules-based classification process and a classification score computed according to the machine classification process, each classification score indicating a probability that the first category is correct;
        assigning the first category having the highest classification score to the electronic message; and
        displaying at least a portion of the electronic message in a group with other electronic messages associated with the first category.

2. The method of claim 1, wherein at least one of the one or more syntactic pairs comprises a verb in a second sentence of the electronic message and a subject in the second sentence, wherein the subject performs the verb in the second sentence.

3. The method of claim 1, wherein:
    the feature vector is input into a classifier,
    the classifier is trained on a set of training feature vectors, each training feature vector being associated with a respective category,
    each training feature vector corresponds to an electronic message previously received by one or more users, and
    the set of training feature vectors is selected based upon failure of the rules-based classification process to identify correct categories for the electronic messages corresponding to the training feature vectors.

4. The method of claim 1, wherein the one or more programs comprise an email application.

5. The method of claim 1, wherein the feature vector includes one or more features based on metadata from the message.

6. A computing device, comprising:
    one or more processors;
    memory; and
    one or more programs stored in the memory configured for execution by the one or more processors, the one or more programs comprising instructions for:
        storing, in the memory, a plurality of syntactic pairs of words which are likely to be useful to perform a categorization process;
        receiving an electronic message;
        extracting two or more syntactic pairs of words from content of the electronic message, wherein:
            at least one of the two or more syntactic pairs of words comprises a verb in a first sentence of the electronic message and an object in the first sentence, and wherein the verb operates on the object in the first sentence; and
            at least one of the two or more syntactic pairs of words comprises a verb in a second sentence of the electronic message and a subject in the second sentence, wherein the subject performs the verb in the second sentence;
        determining which ones of the extracted syntactic pairs of words match syntactic pairs of words stored in the memory;

forming a feature vector comprising the determined extracted syntactic pairs of words that match the syntactic pairs of words stored in the memory;

determining a first category based on the feature vector using a rules-based classification process and a machine classification process;

selecting a highest classification score from among a classification score computed according to the rules-based classification process and a classification score computed according to the machine classification process, each classification score indicating a probability that the first category is correct;

assigning the first category having the highest classification score to the electronic message; and displaying at least a portion of the electronic message with an indication of the first category.

7. The computing device of claim 6, wherein:

the feature vector is input into a classifier, the classifier is trained on a set of training feature vectors, each training feature vector being associated with a respective category, each training feature vector corresponds to an electronic message previously received by one or more users, and the set of training feature vectors is selected based upon failure of the rules-based classification process to identify correct categories for the electronic messages corresponding to the training feature vectors.

8. The computing device of claim 6, wherein the displaying displays at least a portion of the message in a group with other messages associated with the first category.

9. The computing device of claim 6, wherein the one or more programs comprise an email application.

10. A non-transitory computer readable storage medium storing one or more programs configured for execution by a computing device having one or more processors and memory, the one or more programs comprising instructions for:

storing, in a database, a plurality of syntactic pairs of words which are likely to be useful to perform a categorization process;

receiving an electronic message;

extracting two or more syntactic pairs of words from content of the electronic message, wherein:

at least one of the two or more syntactic pairs of words comprises a verb in a first sentence of the electronic message and an object in the first sentence, and wherein the verb operates on the object in the first sentence; and at least one of the two or more syntactic pairs of words comprises a verb in a second sentence of the electronic message and a subject in the second sentence, wherein the subject performs the verb in the second sentence;

determining which ones of the extracted syntactic pairs of words match syntactic pairs of words stored in the database;

forming a feature vector comprising the determined extracted syntactic pairs of words that match the syntactic pairs of words stored in the database;

determining a first category based on the feature vector using a rules-based classification process and a machine classification process;

selecting a highest classification score from among a classification score computed according to the rules-based classification process and a classification score computed according to the machine classification process, each classification score indicating a probability that the first category is correct;

assigning the first category having the highest classification score to the electronic message; and displaying at least a portion of the electronic message in a group with other electronic messages associated with the first category.

11. The computer readable storage medium of claim 10, wherein:

the feature vector is input into a classifier, the classifier is trained on a set of training feature vectors, each training feature vector being associated with a respective category, each training feature vector corresponds to an electronic message previously received by one or more users, and the set of training feature vectors is selected based upon failure of the rules-based classification process to identify correct categories for the electronic messages corresponding to the training feature vectors.

12. The computer readable storage medium of claim 10, wherein the one or more programs comprise an email application.

* * * * *

UNITED STATES PATENT AND TRADEMARK OFFICE
CERTIFICATE OF CORRECTION

PATENT NO. : 11,140,115 B1  
APPLICATION NO. : 14/565235  
DATED : October 5, 2021  
INVENTOR(S) : Lukacs Page 1 of 1

It is certified that error appears in the above-identified patent and that said Letters Patent is hereby corrected as shown below:

In the Claims

Claim 8, Column 13, Line 29:
Now reads: "the message"; should read -- the electronic message --

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*